Figure 1A:
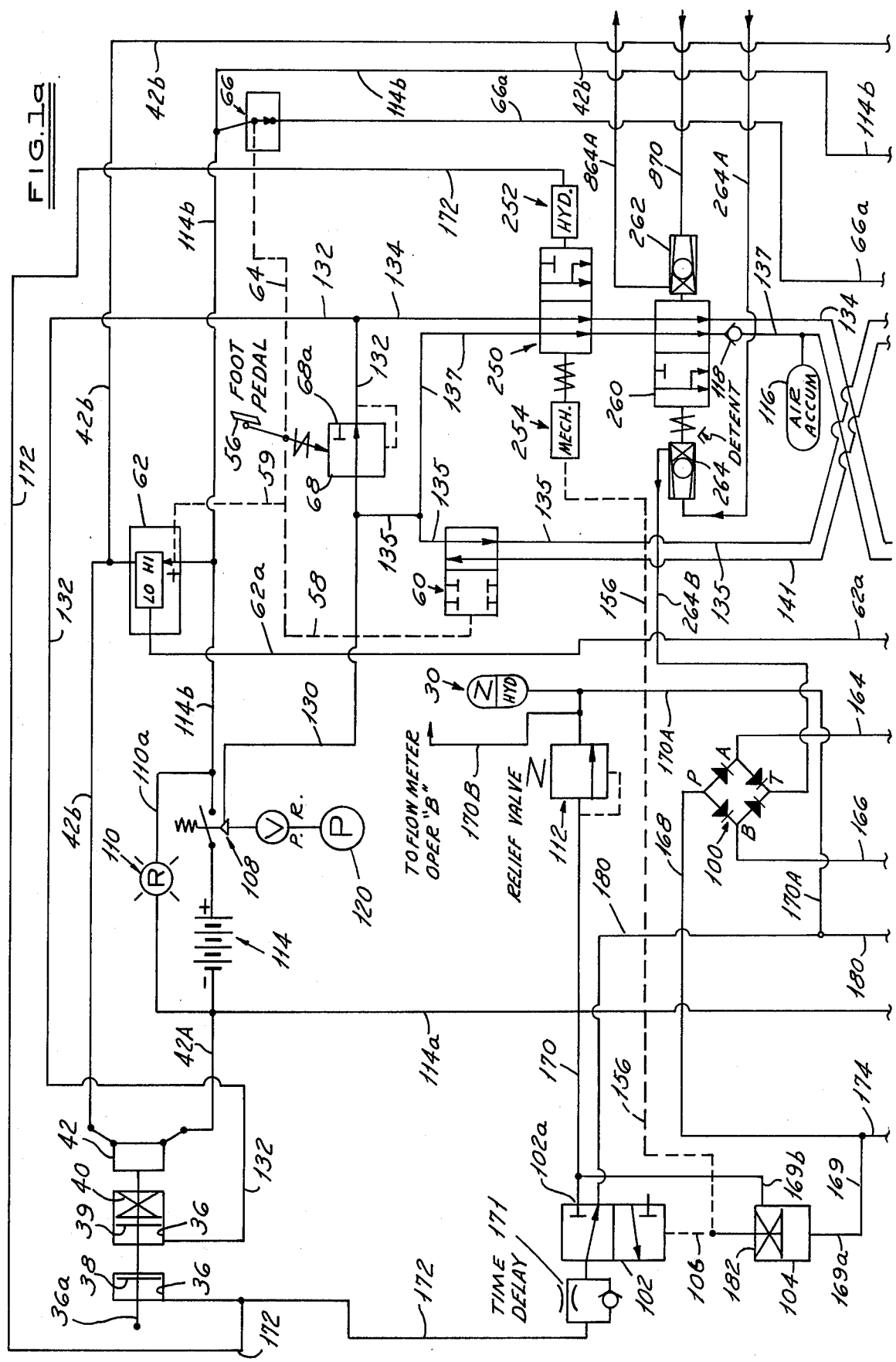

United States Patent [19]

Black et al.

[11] 4,082,369
[45] Apr. 4, 1978

[54] ANTI-SKID AND PRESSURE BALANCED HYDRAULIC BRAKE SYSTEM

[76] Inventors: Richard D. Black, 1815 Russell, Lincoln Park, Mich. 48146; Thomas E. Morgan, Jr., 2838 Aspen La., Bloomfield Hills, Mich. 48013

[21] Appl. No.: 711,110

[22] Filed: Aug. 2, 1976

[51] Int. Cl.² .............................................. B60T 8/02
[52] U.S. Cl. ........................................ 303/3; 188/296; 303/13; 303/116
[58] Field of Search ........................................ 303/2-3, 303/6 R, 10–11, 61, 13, 15–16, 20, 68–69, 91, 93, 92, 71, 113–119, 63; 188/290–296, 72.1, 1, 181 A, 365–367, 170; 137/49, 831; 60/700; 192/3 R, 3.23, 4 R, 61, 12 R; 417/321, 339, 355; 74/691, 191, DIG. 3

[56] References Cited

U.S. PATENT DOCUMENTS

| | | | |
|---|---|---|---|
| 2,869,687 | 1/1959 | Keim et al. | 303/116 X |
| 3,388,951 | 6/1968 | Marcellus | 303/116 |
| 3,667,816 | 6/1972 | Harned | 188/181 A X |

*Primary Examiner*—Trygve M. Blix
*Assistant Examiner*—Douglas C. Butler
*Attorney, Agent, or Firm*—Barnes, Kisselle, Raisch & Choate

[57] ABSTRACT

A braking system for vehicles in which each wheel of the vehicle is arranged to drive a variable displacement hydraulic pump, the output of which is restricted to cause a slowing force on the wheel. A directional control is incorporated with a servo-control valve which is responsive to operator signals acting through a relay system. Electrical back-up controls are provided to take over in the event of fluid supply failure, and brake balancing with anti-lock-up valves are incorporated in the system together with a static brake which locks the wheel when the vehicle comes to a stop.

29 Claims, 18 Drawing Figures

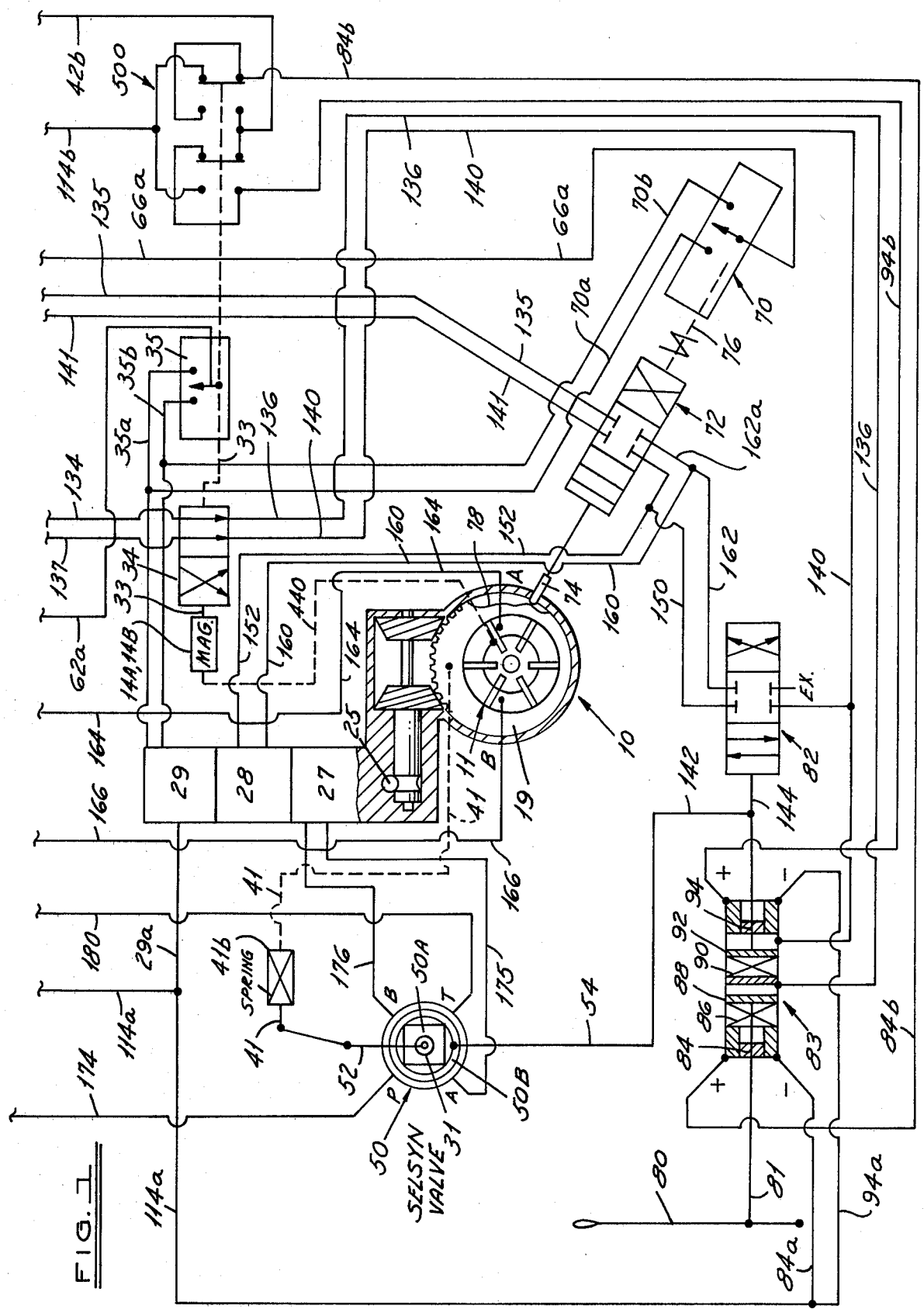

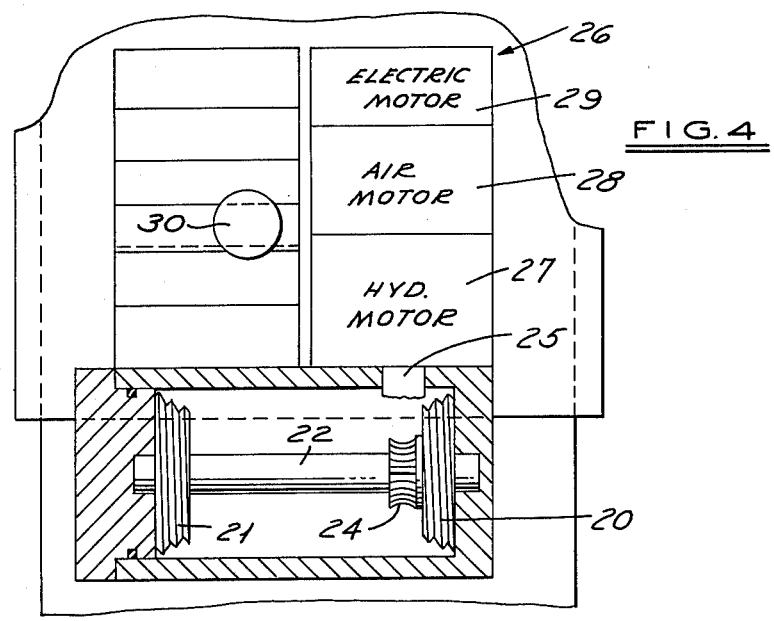
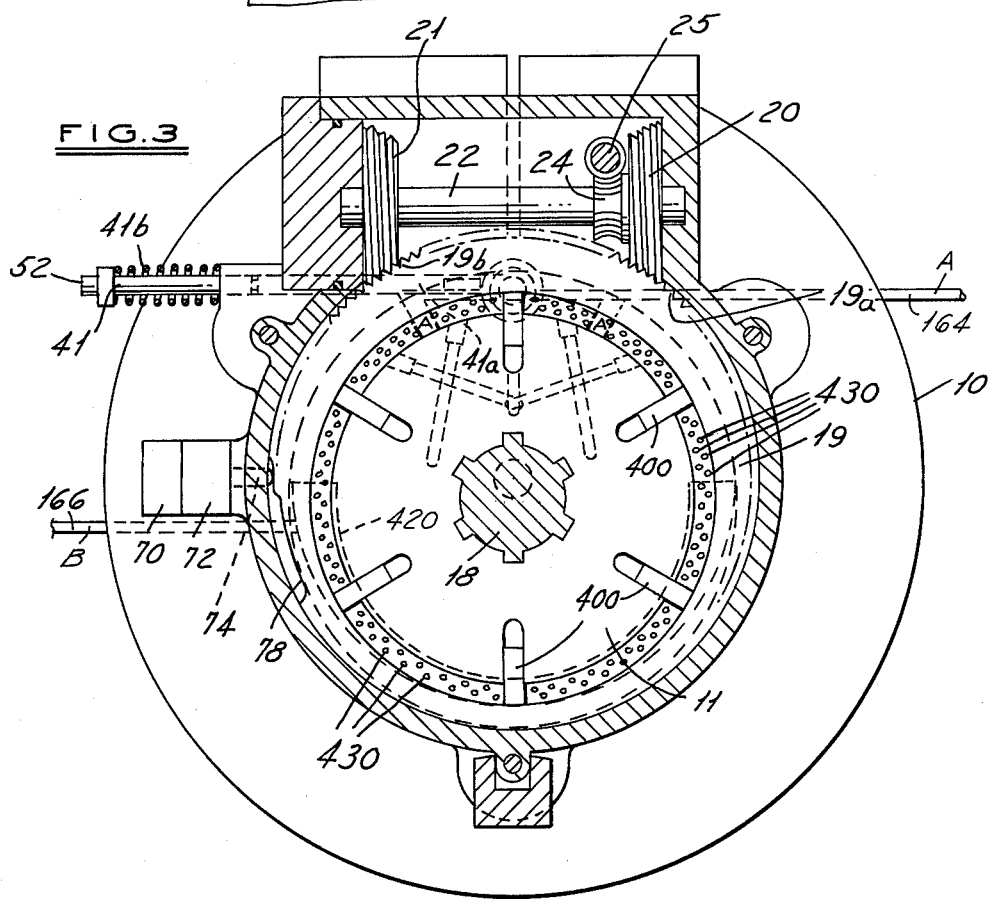

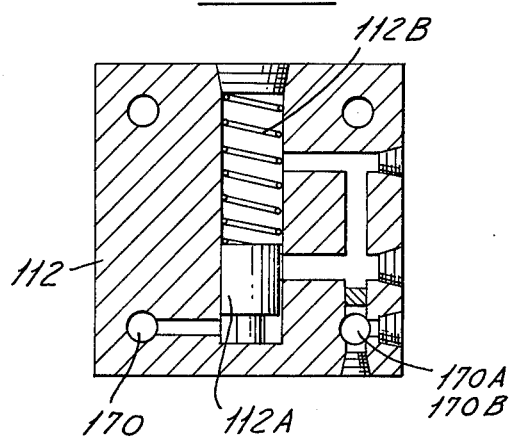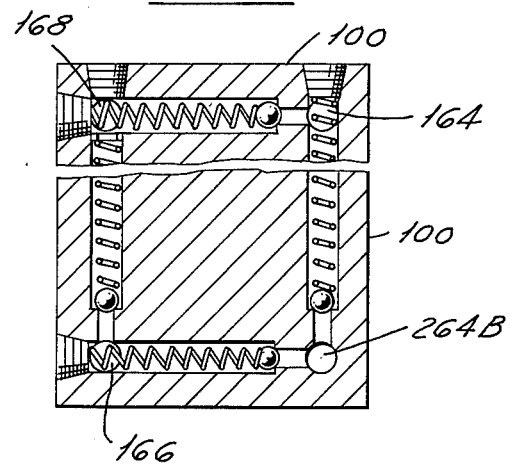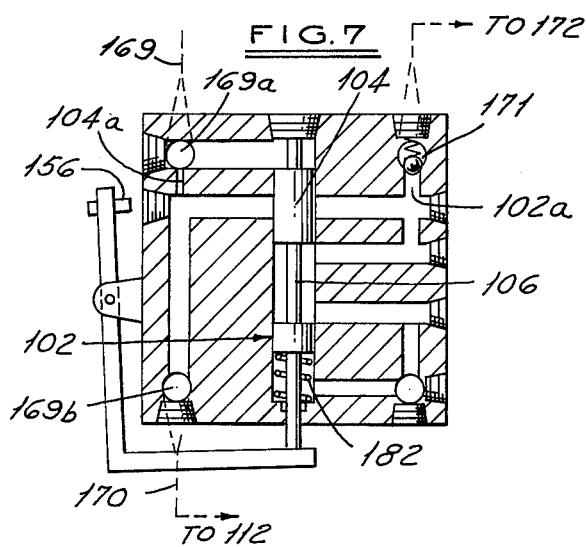

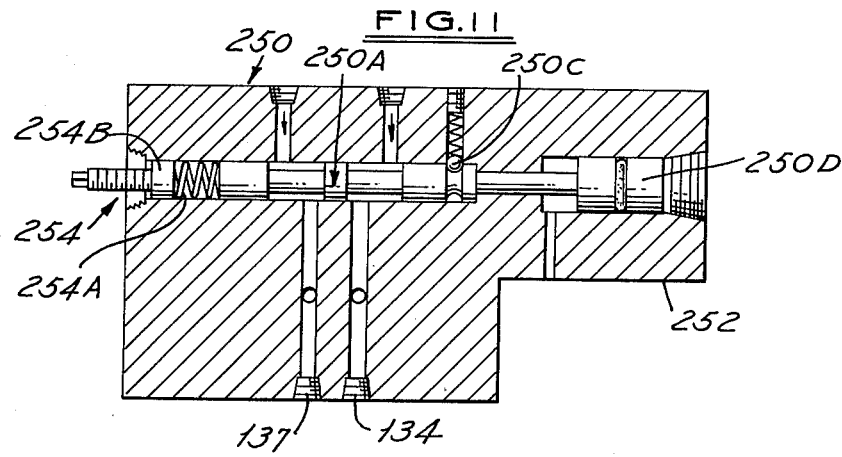
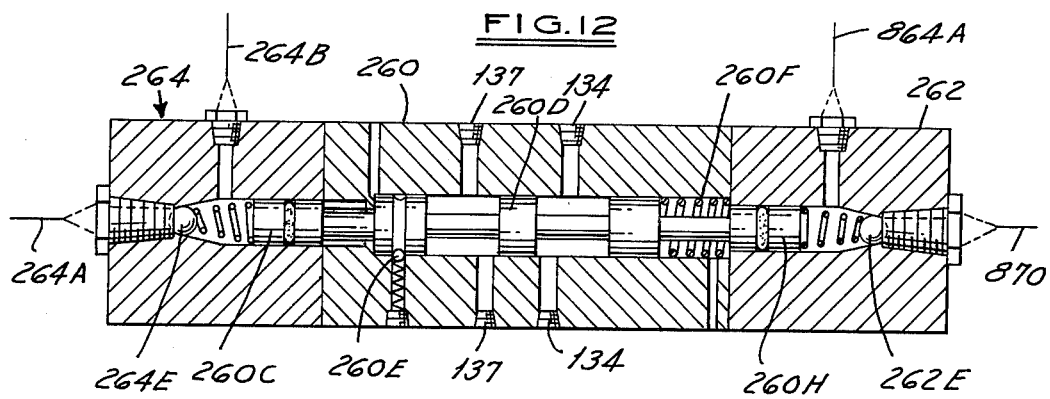
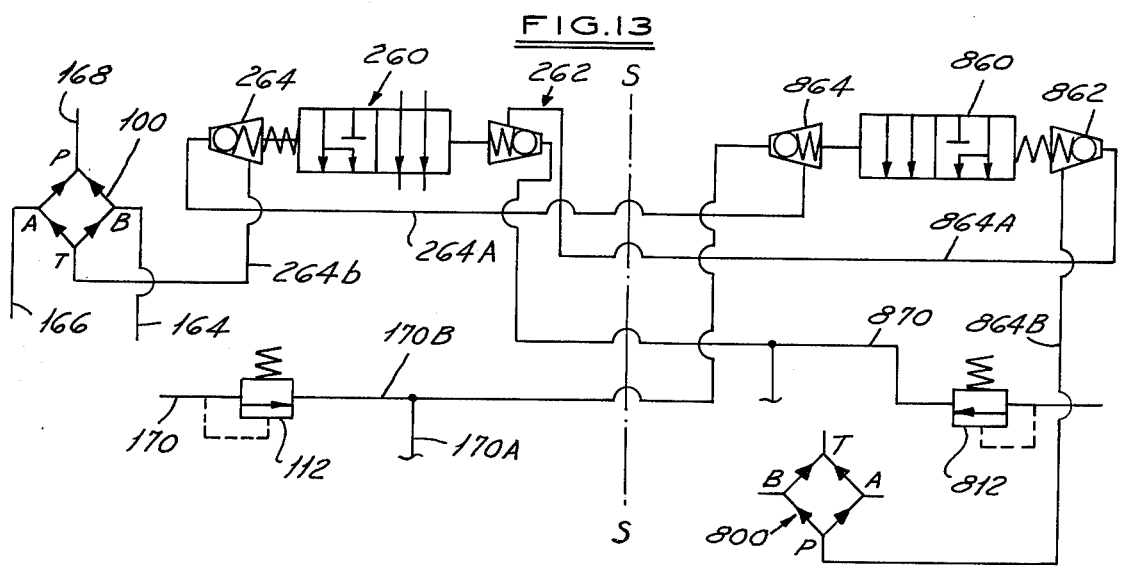

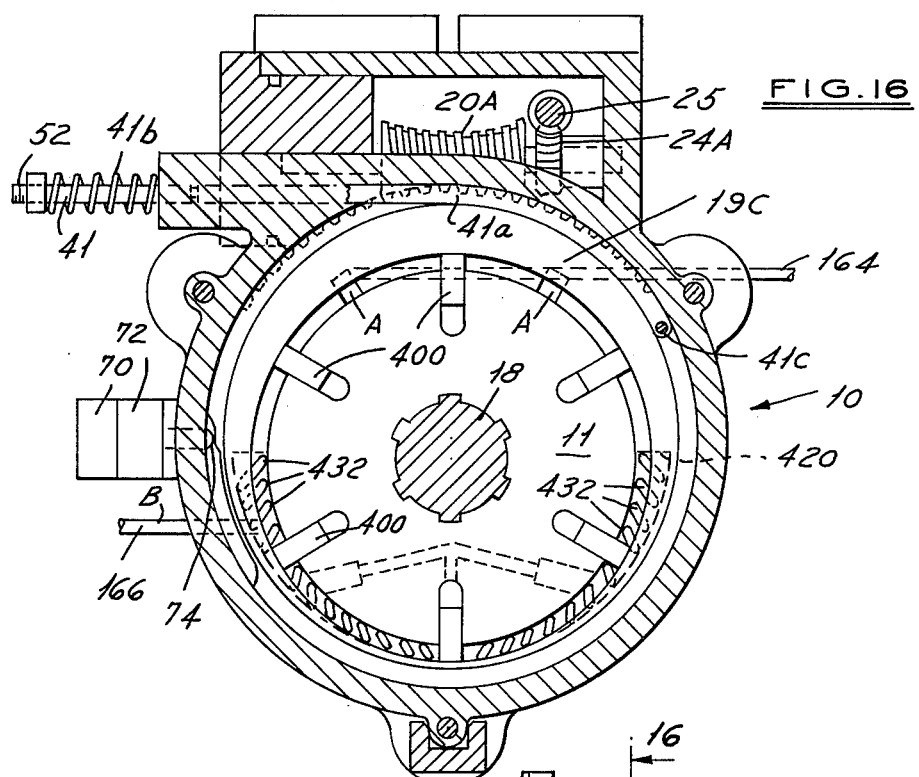
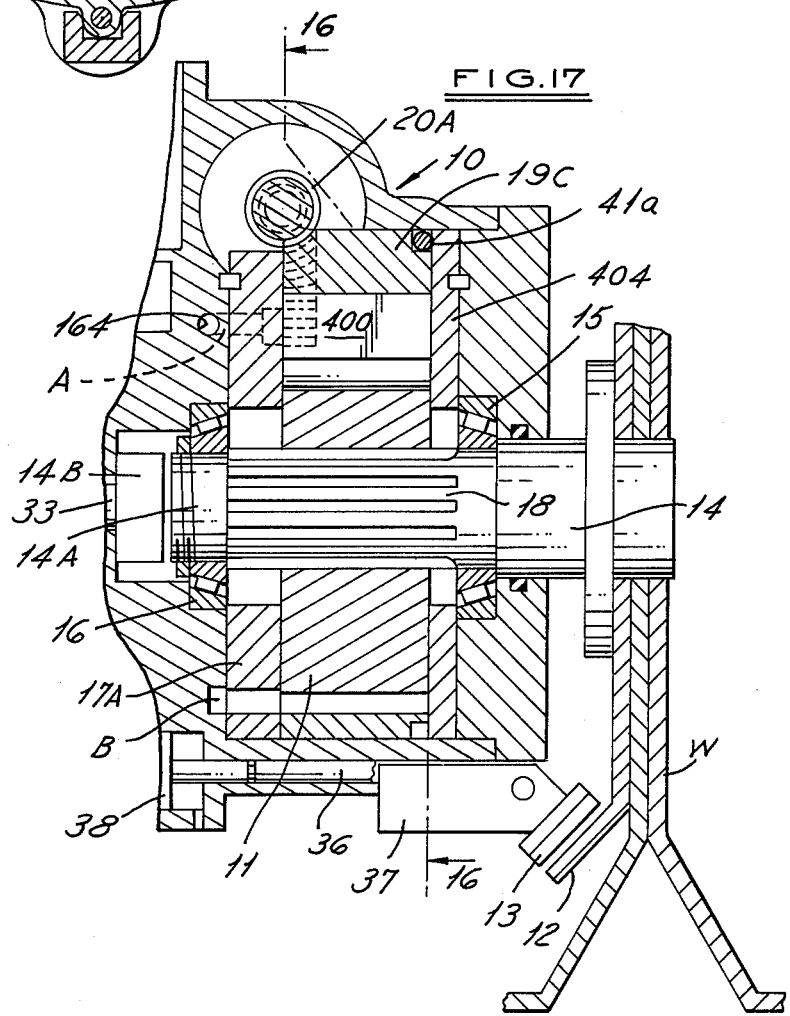

ANTI-SKID AND PRESSURE BALANCED HYDRAULIC BRAKE SYSTEM

This invention relates to a Balanced Hydraulic Brake System and more particularly to a brake system which utilizes a fluid pressure build-up at individual wheels of a vehicle for control of the wheel speed.

It is an object of the invention to provide a brake system which is especially adapted to balancing of braking action at the respective wheels of a vehicle and also one which has anti-skid potential.

It is a further object to provide a system which will adapt to brake failure at any one wheel without destroying the braking action at other wheels. It is also an object to provide a system which is adapted to the use of an electrical or mechanical alternate back-up system as a safety system.

It is a further object of the invention to provide a brake system which can utilize an air pilot system as the controlling medium with an electrical back-up system in the event of failure of the air system.

Another object of the invention is the provision of a basic unit which can serve as a variable torque converter, displacement transmission, a variable clutch or hydraulic motor or pump. In addition, the disclosure includes rectifier valves, flow detector valves and Selsyn valves having possible general use beyond the present invention.

Other objects and features of the invention will be apparent in the following description and claims in which there is a description of the invention and a detailed disclosure of the elements together with the principles of operation set forth in connection with the best mode presently contemplated for the practice of the invention.

DRAWINGS accompany the disclosure and the various views thereof may be briefly described as:

FIG. 1, a portion of a circuit diagram illustrating the various elements of the system.

FIG. 1a, a completing portion of a circuit diagram illustrated in FIG. 1.

Figure 2:
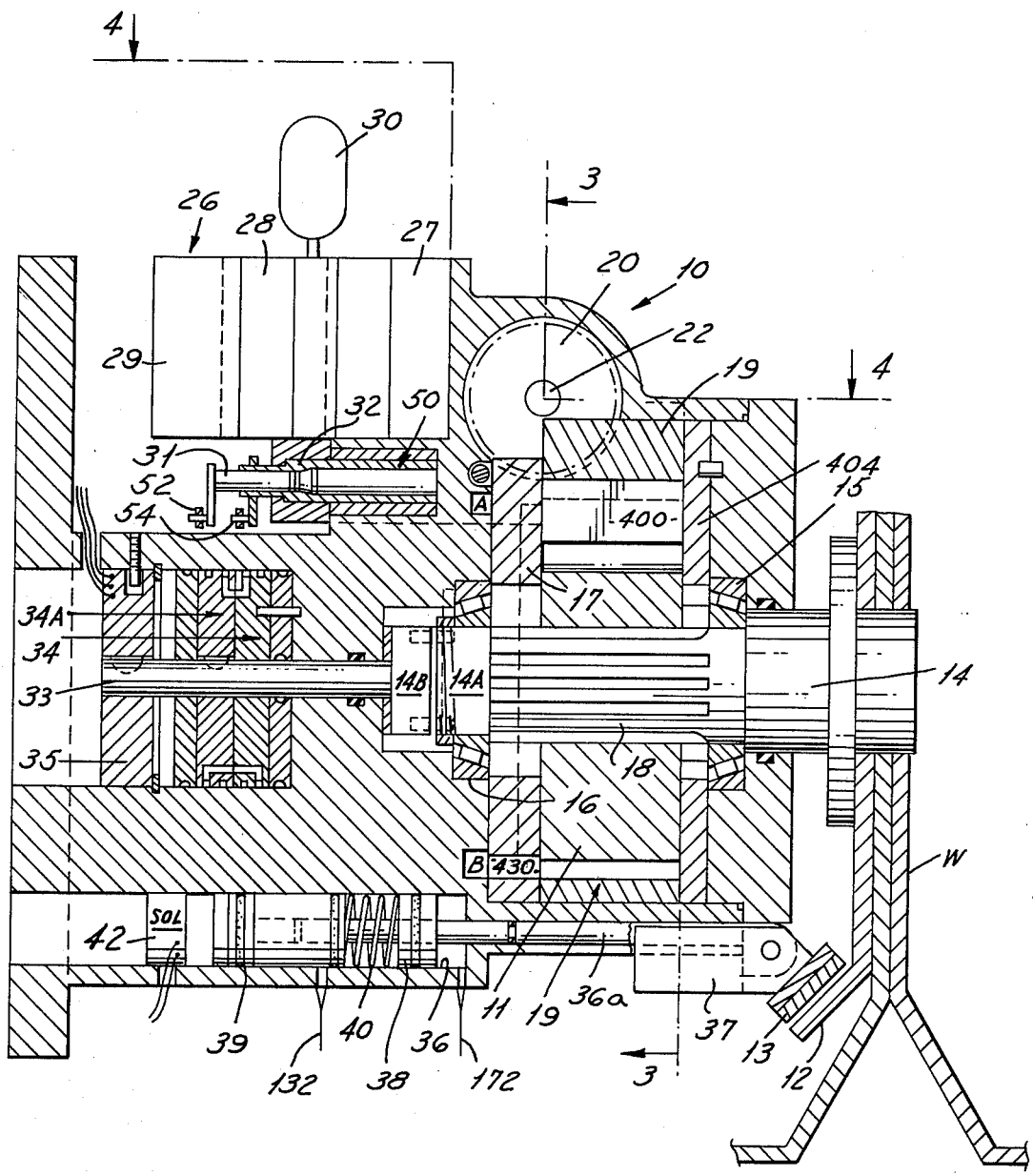

FIG. 2, a sectional view through the wheel element of the apparatus.

FIG. 3, a sectional view of the wheel element on line 3—3 of FIG. 2.

FIG. 4, a sectional view of the wheel element on line 4—4 of FIG. 2.

FIG. 5, a sectional view of a main relief valve in the system.

FIG. 6, a sectional view of a rectifier valves.

FIG. 7, a sectional view of a combination three-way, two-position valve and flow detector valve.

Figure 8:
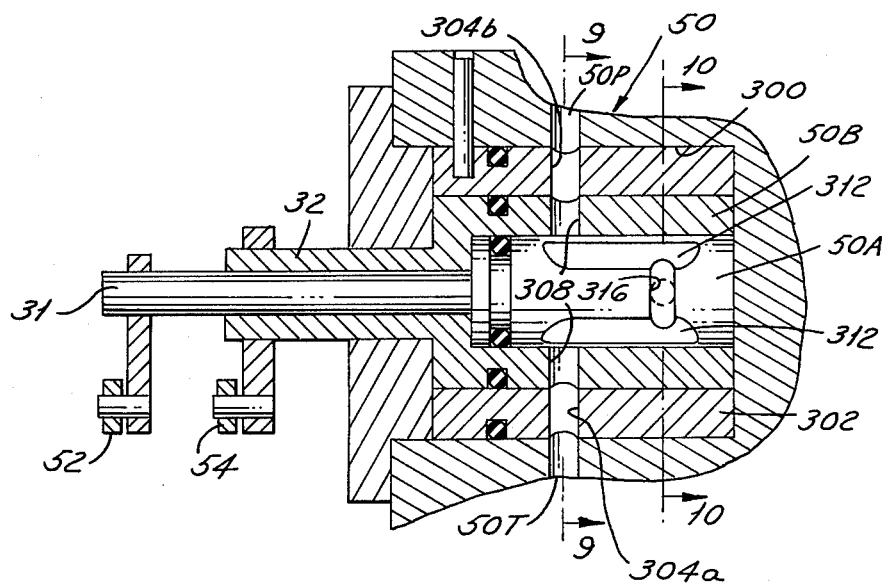

FIG. 8, a sectional view of a Selsyn valve, i.e., a servo-control or follow-up valve.

Figure 9:
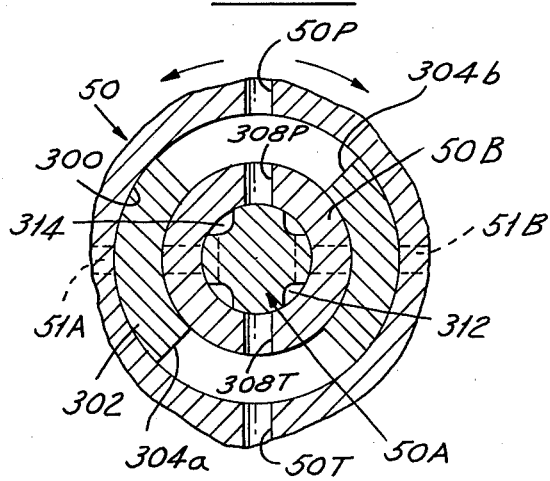

FIG. 9, a sectional view on line 9—9 of FIG. 8.

Figure 10:
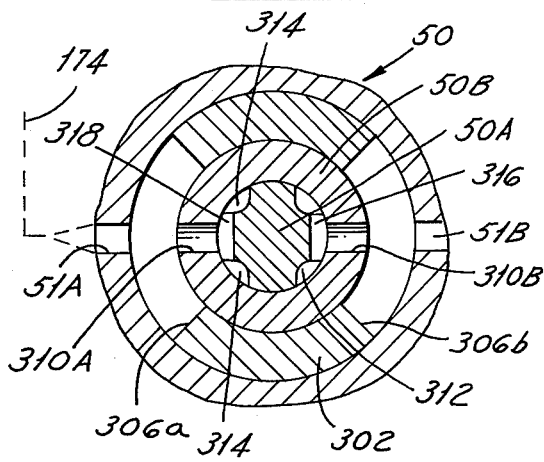
Figure 14:
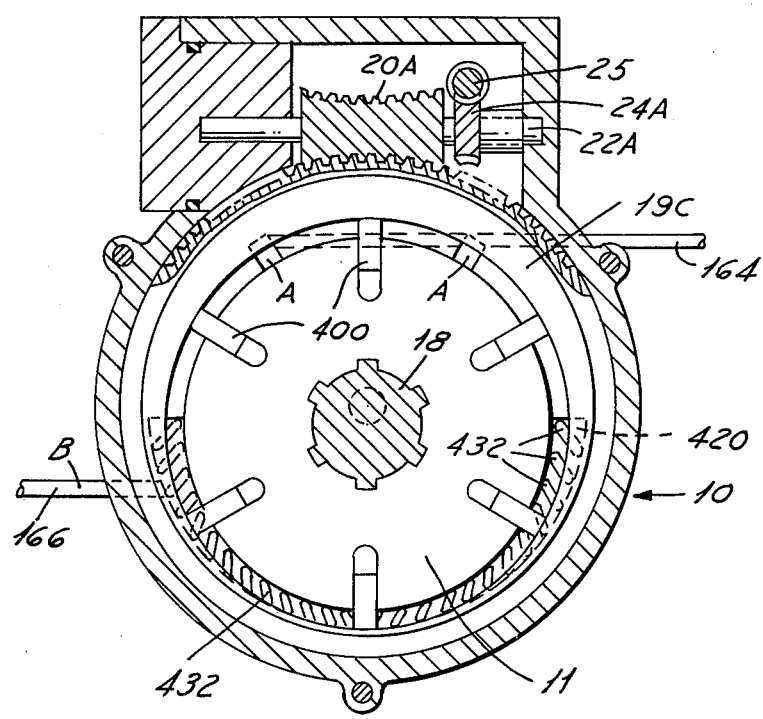

FIG. 10, a section on line 10—10 of FIG. 8.

FIG. 11, a sectional view of a lock-up prevention valve.

FIG. 12, a sectional view of a brake balance valve.

FIG. 13, a diagrammatic drawing of the brake balance system.

FIGS. 14 to 17, sectional views of a modified pump design for wheel actuation.

With reference to the drawings, and particularly to FIG. 1, the main elements of the circuit will first be described and subsequently more detail as to the function and interrelationship will be furnished in connection with the description of the operation of the system.

A main brake housing 10 (also FIGS. 2 and 3) which is located at the vehicle wheel has a vane pump rotor 11 driven by the wheel axle. A dual wheel W on the axle has a conical brake drum 12 and a conical brake shoe 13. A wheel axle 14 is mounted in bearings 15 and 16 and the pump rotor 11 is mounted on a splined portion 18 of the axle 14. On one side of the rotor 11 is a movable port plate 17 also located against a pump housing or stator 19 which surrounds the rotor, each having teeth 19a and 19b (FIG. 3) on the outer periphery to engage with helical drive screws 20, 21 co-mounted on a shaft 22 which carries a worm gear 24 driven by a worm shaft 25. The worm shaft 25 passes into a motor section 26 (FIG. 4) which contains a hydraulic brake operator motor 27, a reversing pilot duty air motor 28, and a reversing pilot duty electrical motor (12 v. DC) 29. Thus, the worm gear shaft 25 can be rotated by any one of these motors. A spring-loaded hydraulic accumulator chamber 30 (FIGS. 1a, 2 and 4) is provided in the circuit located adjacent the motors 27, 28 and 29. Control shafts 31 and 32 (FIG. 2) for a Selsyn valve are provided with actuating levers to be described below.

At the inner end of axle shaft 14 is a magnetic disc operator combination consisting of a magnetic set 14A on shaft 14 and a magnetic set 14B on a disc at the end of a co-axial shaft 33 (FIG. 2). The shaft 33 provides a mechanical link which connects a disc type air valve 34, which is a four-way, two-position valve, and a rotary electric switch 35, a two-position switch.

At the lower portion of the housing 10 (FIGS. 2 and 1a) is a cylinder bore 36 which contains a series of pistons connected to a shaft 36a which drives the actuator block 37 connected to the conical brake block 13. A hydraulic piston 38 is mounted on shaft 36a close to the right end of the cylinder bore. An air piston 39 is also provided. A spring 40 urges the shaft 36a to a brake locking position. A 12 v. DC solenoid 42 is located at the left end of the bore.

Under normal stop conditions, while the vehicle is parked, there are no forces acting on rod 36a (FIG. 2) except the spring 40 which forces the rod and the conical brake block 13 against the conical brake drum 12. The cone brake can be released by hydraulic pressure in the brake system, acting on piston 38 in bore 36, by air pressure acting on piston 39, or by solenoid 42 also acting on shaft 36a.

In stop position, there is no hydraulic pressure from pump 10 and the air pilot system must be utilized to release the cone brake with pressure in line 132. In the event of failure in the air system, the electrical system can operate solenoid 42 to release the brake. Once the wheels are in motion, hydraulic pressure will be generated and applied to line 172 to back up piston 38 to hold the brake off. As the stator ring 19 approaches neutral, the hydraulic pressure will diminish and air pressure through line 132 will act on piston 39 to keep the dead stop brake off. In emergency air failure, the solenoid will take over.

As viewed in FIG. 3, it will be seen that the pump rotor 11 has slidable radial vanes to contact the inner periphery of the pump chamber of housing 19. These vanes may be backed by a light spring but will also be backed by the pressure in the system as is common in vane type pumps. At the upper left of FIG. 3 is a spring biased shaft 41 which provides a mechanical link to connect the stator ring 19 to the inner spool 50A of a servo (Selsyn) valve 50 shown in FIGS. 8, 9 and 10 and diagrammatically in FIG. 1. A link lever 52 on shaft 31 of the spool 50A serves as a mechanical link to connect stator ring 19 to the spool of the servo-valve 50. A link 54 (see FIGS. 1 and 8) on shaft 32 of the servo sleeve 50B connects to a link 142 fastened to an actuator 144.

The operation of this servo-valve will now be described. The servo valve 50 is shown diagrammatically in FIG. 1 and in detail in FIGS. 8, 9 and 10. The housing 50 has a blind end bore 300 in which is fitted a cylindrical liner 302 which has arcuate ports 304a and 304b in the plane of FIG. 9 and arcuate ports 306a and 306b displaced 90° from ports 304a and 304b in the plane of FIG. 10. Ports 304a and 304b register with ports 50P and 50T in housing 50, respectively, and ports 306a and 306b register with ports 51A and 51B.

Within the cylinder 302 is a rotatable hollow sleeve 50B which has a tubular actuating shaft 32. Sleeve 50B has cross ports 308P and 308T in the plane of FIG. 9 and cross ports 310A and 310B, displaced 90°, in the plane of FIG. 10. A servo valve rotor 50A rotates in the sleeve 50B, this rotor having two pairs of axial slots 312 and 314 connected respectively by chordal grooves 316 and 318 (FIG. 10). As shown in FIG. 9, the slots 312 and 314 are not open to the ports 308P and 308T when the valve parts are centered as shown in FIG. 9.

The servo valve sleeve 50B is operated by link 54 and link 142 of FIG. 1 acting on shaft 32. The valve core 50A is operated by shaft 31 and links 52 and 41 connected to the stator housing 19.

In order for the servo valve 50 to function, it is essential that there is pressure at port 50P (FIG. 9). This pressure derives from the rotor of pump 10 and flows through a rectifier valve 100 after the rotor and stator have been displaced by the actuation of the brake pedal. Assume that the valve core 50A is shifted clockwise, fluid enters port 50P and passes through 304b to enter port 308P. With the core 50A rotated, the pressure will go to the top channel 314 and then to the port 310A in sleeve 50B and then through arcuate port 306a to port 51A and line 174 of the system. On return from the brake operating system, through port 51B, the fluid travels through port 306b, right-hand port 310B, channel 312, cross slot 316, and channel 312 to port 308T, port 304a and servo port 50T.

The above-described flow will continue until either of two things occur. If spool or core 50A is shifted counterclockwise to close port 308P and 308T, flow will cease or, if the sleeve 50B is shifted clockwise, to close port 308P and 308T, flow will likewise cease.

As described, both the core spool 50A and the servo sleeve 50B depend on an external operating arm to bring the valves to a neutral non-flow position. The valve core 50A is controlled by the position of the stator ring 19 through links 41 and 52. The valve sleeve 50B is controlled by the relay cylinder combination, links 54 and 142.

When the core spool 50A is moved counterclockwise, fluid then flows from port 50P to port 51B and into the operating system, the return being through 51A to 50T. The flow in this direction will continue until the servo sleeve reaches the neutral shut off position.

A lever or pedal 56, FIG. 1a, in the cab of the vehicle is connected by a link 58 to a two-position air valve 60, by a link 59 to a potentiometer 62, by a link 64 to a two-position switch 66 (12 v. DC) (N/C), and directly to a main brake system regulator air valve 68 in the operator's compartment.

In FIG. 3, there is shown at the left side a three-position (center N/O) detent switch 70 connected to a detent air valve 72 shown diagrammatically in FIG. 1. The air valve is a four-way, three-position, center-block valve which is cam operated. The detent is shown at 74 in dotted lines (see also FIG. 1). A link 76 connects air valve 72 to the detent switch 70. The detent 74 rides on the cam surface 78 of the stator ring 19. Depending in the direction of rotation of the stator 19, the valve 72 will move from a normally line block position to a straight through position or a criss-cross position.

The purpose of the air detent valve 72 and the switch 70 is, therefore, to detect the direction of the stator ring 19 displacement and return the stator to neutral position when the brake pedal is released. Air is the primary operating medium for the system but in the event of a loss of air pressure, the electrical system will provide a back-up and perform the same function. Lines 162 and 150 from valve 82 connect to valve 72. Lines 135 and 141 lead from valve 72 to the portion of the system shown in FIG. 1a. A suitable spool valve in a sleeve housing blocks flow through the valve 72 in neutral position. In one position (extreme left) flow will pass through the valve in one flow pattern. In a second position (extreme right) flow will take place in another flow pattern.

The electrical switch 70 is also associated in the back-up electrical system and actuated by the detent 74 as will be described to provide emergency function similar to that of air valve 72.

With reference to FIG. 1, an emergency manual operator lever 80, accessible to the vehicle operator in the cab, can override the relay cylinder 83 to control the three-position air valve 82. Integral between the lever 80 and the valve 82 is the relay operating cylinder 83 with back-up solenoids composed of several elements shown from left to right as an operating link 81, a solenoid operator 84 (12 v. DC), a spring 86, an air cylinder 88, a second spring 90, an air cylinder 92 and a solenoid operator 94.

This relay cylinder 83 operates on the principle of balanced air systems. The assembly 83 is free floating and located in the mechanical link between the emergency manual operator 80, the link 81, and link 144, 142 which shifts the spool port sleeve 50B of the servo valve 50. Link 144 is also connected to the operative spool of valve 82.

By maintaining a balanced regulated air pressure in air lines 136 and 140, the relay cylinder 83 is in neutral position. By reducing pressure in air line 140, while maintaining the original pressure in line 136, it will be seen that piston 92 operating link 144 will extend to the right by spring 90 causing link 54 to travel in a counterclockwise direction around the servo valve 50. Similarly, if pressure in line 136 is reduced, the piston 88 will move to the right by the action of spring 86 pulling the assembly 83 to the left and this will move link 144 and link 54 in a clockwise direction around the servo valve 50. The control of the pressure in lines 136 and 140 will be described later.

An electrical back-up system which will be described in detail later is provided in the event of air supply failure. If there is a complete air pressure failure, when line 136 is pressurized, the electrical system will be actuated and the solenoid 84 operating in a suitable winding will take over the function of piston 88. If the wheel is turning in the opposite direction, pressure would be lost in line 140 and solenoid 94 will take over the function of piston 92. In either case, the brake would be off (not operated for braking) until an operator actuates a control to apply the brakes. This has reference to the dynamic brake system.

If the air supply and the electrical system are both inoperative, then the air reservoir accumulator 116 (FIG. 1a) will direct pressure through lines 137 and 134 to air cylinder 92 which will shift valve 82 and direct flow from line 140 to air motor 28 to initiate the application of the braking system. Beyond this, the relay cylinder unit 83 will have to be operated manually with lever 80. There will, of course, be a large amount of drag in the system when the power units are off. Once the vehicle stops under the above emergency conditions, the full-stop cone brake 13 will be locked and the vehicle cannot be moved until repairs are effected.

Shown centrally in FIG. 1a, and in detail in FIG. 6, is a rectifier valve 100, having ports A, T, B and P. The function of this valve will be evident in the description of the operation. This valve has four check valves. It will be seen that pressure at Port A can flow only to port P. Pressure at Port B can flow only to port P. Likewise, tank return flow at T can flow to Ports A or B, whichever one is not pressurized. To the left of this rectifier valve 100 is a valve combination consisting of a three-way, two-position valve 102 and a flow detector valve 104. These valves are connected by a mechanical link 106. In FIG. 7, these valves are shown in detail.

An air pressure switch 108 is shown in the electrical circuit in FIG. 1a which serves to bring in the electrical current when there is a loss of air pressure. A red warning light 110 in the operator cab would signal this conversion to electrical control. A battery 114 serves to power the electrical circuit. In the air system, an air accumulator tank 116 is provided and a unidirectional check valve 118 is positioned between this accumulator and an air supply pump 120. See lines 130, 135 and 137.

A main relief valve 112, detailed in FIG. 5, is provided in the hydraulic circuit connected to line 170 and discharging to line 170A and 170B. A piston 112A is backed by a spring 112B. A selected movement of piston 112A will permit escape of liquid to lines 170A and 170B.

Also in the system illustrated in FIGS. 1 and 1a is an anti-lock-up device which prevents any particular wheel from locking up and skidding. A fluid valve 250 (detailed in FIG. 11) is arranged in the control lines of the circuit with a hydraulic control 252 at one end and a mechanical control 254 at the other end. The mechanical control 254 is connected by linkage 156 to linkage 106. The function of this anti-lock-up device will be described below.

A brake balance system is also provided to balance the braking force on all wheels in the system. A fluid valve 260 (detailed in FIGS. 12 and 13) is disposed on the same control lines as is the anti-lock-up device. At each end of the valve 260 are, respectively, flow meter devices 262 and 264 each connected to a rectifier valve 100 for a particular wheel system. FIG. 13 illustrates diagrammatically the relationship of the balance valve to the rectifier valves 100 and 800 of each wheel system.

The main brake housing 10 illustrated in FIGS. 1, 2, 3 and 4 will now be described in greater detail. The outer housing 10 encloses an adjustable stator or rotor housing 19 which in turn surrounds the axle driven rotor 11 which carries spring-backed, radial sliding vanes 400 moving in suitable radial slots in the rotor. Suitable interconnected passages are provided to carry pressure to the pockets behind the vanes to urge them outwardly when pressure is developed in the pump. The rotor and stator are mounted such that they can become eccentrically disposed to provide recesses which increase and decrease in size in front of a circular pattern of ports 430 in the port plate 17. This provides the inlet (increasing in size) and the outlet (decreasing in size) of the pump. The pump is, of course, reversible. A stationary port plate 404, pinned against rotation, is provided on the right side of rotor 11. Vane type pumps of this general nature are well known in the hydraulic machine tool industry.

The device creates no pressure when the axle 18 is rotating and the rotor 11 is concentric in the circular recess of housing 19. However, when the housing 19 is rotated on an axis which is eccentric to that of the rotor, there will be initiated a pumping action. The means for creating the eccentric position of the stator is a helical screw arrangement of shaft 22 (FIG. 3). A right-hand thread screw 20 drives teeth on port plate 17. A right-hand thread screw 21 drives teeth on the stator ring 19. Thus, it will be seen that rotation of shaft 22 will cause the port plate 17 and the stator ring to rotate in the same direction.

The stator 19 is connected by a cable 41a to link 41 through a spring 41b and then to link 52 and the core valve 50A of the servo valve 50.

The stationary housing 10 has one arcuate port 420 at the bottom of the circular path of the vanes 400 shown in FIG. 3 (dotted lines) cut into the face of the main housing recess which houses the stator ring 19. This arcuate port 420 is wider at the top ends than it is at the bottom area and it connects to an inlet passage 166 also referenced as B. Adjacent of the path of the vanes are two spaced outlet ports A leading to an outlet conduit 164. This is the best arrangement for a six-vane rotor. Overlying port 420 and ports A are the patterned ports 430 in the port plate 17 previously described and also shown in FIG. 3. Port 420(B) and ports A which are radially disposed adjacent the path of rotor vanes 400 serve, respectively, as inlet and outlet ports regardless of the direction of rotation of the stator and port plate. These ports are connected respectively to lines 166 and 164 of the FIG. 1 circuit. Stator ring 19 also has a cam surface 78 cut into one portion of the periphery as shown in FIGS. 1 and 3 to cooperate with a plunger or detent rod 74 associated with valve 72. A link shaft 440, shown in dotted lines, FIG. 1, associates rotor 11 with the magnetic directional drive set 14A, 14B shown on FIG. 1 diagrammatically and also illustrated in FIG. 2.

OPERATION

The principle of this brake system is to use air pressure as the pilot or controlling medium and electrical devices as the back-up system in case the air system fails. The hydraulic system is utilized to resist the motion of the wheels and bring the vehicle to a stop.

With full air pressure on the system and the vehicle running, the static cone stop is off and the hydraulic dynamic brake system is not operating except in a neutral or non-pressure creating way. When the air is regulated to a lower pressure in a portion of the pilot system, the dynamic wheel brake begins to function in response to the lower pressure.

In the event that the air pressure fails, the static cone brake is then kept off by the electrical system while the vehicle is operating. A red light in the operator's compartment will turn on to warn the operator that his air pressure has failed, but he can still exercise an available option and operate under the electrical system.

In the operator's control compartment of the vehicle, there will be the main pedal 56 (FIG. 1a) which mechanically operates the potentiometer 62, air valve 60, a two-position switch 66, and a main brake regulator valve 68.

When the operator actuates the pedal 56, there is simultaneous operation of the potentiometer 62, the air valve 60 (a two position valve, — one position all ports blocked, second position all ports open), the switch 66 in a 12 volt DC system (normally closed), and the main brake system regulator valve 68.

The source of air pressure for the system is an air compressor 120 driven by the vehicle power plant which provides, through a suitable pressure regulator, a source of air pressure which holds open a spring biased switch 108 of the electrical system while delivering air under pressure to lines 130, 135 and 137 leading through valves 250 and 260 and a check valve 118 to an air accumulator 116.

When the vehicle is in motion, the axle 14 (FIG. 2) on wheel W is turning and the splined portion 18 will rotate the rotor 11 in the housing 10. Under these conditions, the magnetic control 14A, 14B has shifted the air disc valve 34 and the rotary electric switch 35 to one of two positions, depending on the direction of the wheel rotation. This is the direction sensor for the system.

In FIG. 2, a shaft 33 is mounted coaxially with splined shaft 14, 18. A magnetic drive 440 in FIG. 1 is provided for the actuation of shaft 33 in a limited angular movement. A magnetic set 14A on the end of shaft 18 cooperates in spaced relation with a disc of the same size as shaft 18 having a magnetic set 14B disposed in closely spaced but non-contacting relation. Disc 14B is mounted on rotative shaft 33. Thus, the device is a direction sensor. When the wheel W and axle 14 are rotating in a forward direction (clockwise), the shaft 33 will be rotated in a limited movement, governed by a stop pin (not shown), in a clockwise direction. When the wheel W is reversing, the reverse action will be imparted to shaft 33. A disc air valve is provided to transmit this directional message to the brake system. This valve consists simply of a stationary disc 34 and a rotative disc 34A having valve ports which direct pressure fluid to a particular line depending on the direction of rotation of the wheels. As viewed in FIG. 1, for a forward direction, valve 34 will pass air from line 137 to line 140 and line 134 to line 136. For a reverse direction, the flow will be from line 134 to line 140 and line 137 to line 136.

A directional switch 35 (FIG. 2) is also actuated by shaft 33. This is a rotary switch with a stationary outer ring and a movable inner ring with limited rotative movement in each direction, the function being shown diagrammatically in FIG. 1. The purpose of switch 35 is, of course, to detect direction of wheel rotation electrically in the event of air failure and thus supply current to the electrical brake operating motor 29 in the proper direction and also to supply current to the proper back-up solenoid 84 or 94 located on the relay cylinder 83 and also to supply current to the solenoid 42 on the dead stop cone brake.

It is assumed that the brake system is not actuated because there is full regulated air pressure available to keep the static brake cones 13 in released position. This pressure originating at pump 120 passes through line 130 (FIG. 1a) leading from the pump 120 to valve 68, then to line 132 and air cylinder 39 which holds the static brake in release position. Note that a line 134 leads from line 132 to anti-lock-up valve 250, brake balance valve 260, and then to directional valve 34. Valve 34 has lines 136 and 140 which lead to the relay assembly 83.

Line 137 leads from line 135 down to valve 250 and to valve 260, through check valve 118, past air accumulator 116, and to directional disc valve 34, FIG. 1. A line 135 leads to valve 60 and from valve 60 lines 135 and 141 pass to valve 72. Thus, pressure in line 132 and cylinder 39 moves or holds the static cone brake in release position (FIG. 2). Pressure in lines 134 and 137 passing through directional valve 34 and lines 136 and 140 are reaching the relay assembly 83 and balancing it to a neutral position. Pressure in lines 135 and 141 is blocked at valve 72.

In a normal dynamic braking operation, when the vehicle is moving, the operator will depress the brake pedal 56 (FIG. 1a) which will lower the pressure in the air pilot control system by connecting lines 132 and 134 to relief port 68A in valve 68. Assuming forward direction, this in turn lowers the pressure in line 136 and air cylinder 88 in relay cylinder 83 (FIG. 1) which allows the spring 86 to move the piston of the air cylinder to the right. This moves the link 142 through a connection 144 and also shifts air valve 82. Link 142 controls the position of the port sleeve 50B of valve 50 (FIG. 8).

At the same time, the depressing of the brake pedal 56 shifts valve 60 through mechanical linkage 58 to an all-ports block position which closes lines 135 and 141. These lines are also blocked at valve 72 but valve 72 will be opened by cam 78 when rotor housing 19 is moved. The shifting of air valve 82, previously referred to, starts air motor 28 in the main valve housing through the circuit 140, valve 82, lines 150, 152 and 160, 162. The starting of the motor 28 rotates worm shaft 25 and shifts the brake stator ring 19 in the housing 10 off dead center. Once off dead center, hydraulic pressure builds in the brake housing by reason of the rotation of the pump rotor 11 by the wheel motion and this operates the hydraulic brake stator ring in the following manner. As the pressure builds in the stator ring, hydraulic fluid flows from the inlet port 420(B) to pump port A and to port A of the rectifier valve 100 through line 164.

From the rectifier valve 100, the fluid then flows through lines 168 and 169 to the flow port 169a of detector valve 104 (detailed in FIG. 7). Fluid entering at port 169a moves piston 104 against spring 182 to the extent that pressure fluid may outlet through port 169b to line 170. The fluid thus passes through the flow detector valve but also operates the hydraulic three-way valve 102 through connector 106. Fluid can then pass on to the inlet port 102a of valve 102 and also out port 169b to line 170 leading to relief valve 112 (FIG. 5).

When fluid reaches the inlet port 102a of valve 102 after spool 104 has shifted, it passes to a time delay valve 171 (about ½ to 1 second) and then to line 172 leading to hydraulic cylinder 38 which is actuated to hold the static dead stop cone brake 13 in the off position and this replaces the action of air cylinder 39 which is deactivated due to lower air pressure in line 132.

It will be noted that line 168 is also connected to line 174 leading to port P of the servo valve (Selsyn) 50. It will be remembered that the sleeve 50B of this servo valve (FIG. 8) can be operated by the air cylinder 92 or 88, or by spring 90 or 86, or by solenoid 94 or 84, through links 142 and 54. The core or inner valve 50A of the valve 50 is connected to link 41 leading to stator 19 of pump-motor 10. The movement of the sleeve 50B in turn opens the ports 51A and 51B of the valve (FIGS. 8, 9) to pressure and tank ports respectively of the hydraulic motor 27 through lines 175 and 176 (FIG. 1), which motor operates the worm shaft 25 in the main housing 10. This in turn shifts the port plate and stator ring 19 in the main brake housing 10 in a particular rotational direction, this being detected by the servo valve 50 through the mechanical link 41. This link shifts the spool 50A of the valve 50 until ports 51A and 51B (FIG. 9) are blocked, thereby stopping the hydraulic motor 27 at the predetermined location and causing the port plate and stator ring 19 of the main brake housing also to be stopped in the predetermined place.

The brake system is now functioning normally, the rotor vanes on the wheel axles are pumping the fluid from pump 10 through lines 164 or 166, depending on direction, to the ports A or B of the rectifier valve 100. The fluid flows through lines 168 and 169 to the flow detector valve 104 and then through line 170 on to the relief valve 112. A line 170B carries tank side pressure to a flow meter for brake balancing the action on an opposite wheel. This will be described later. Flow to valve 50 from line 168 and line 174 goes through the servo valve 50 to the system served by it and returns to the T port of the servo valve and then to line 180 joining with line 170A leading to the low pressure side of the relief valve.

The resistance met by the fluid as it passes through the relief valve 122 causes a back pressure on the rotor 11 which provides the braking on the wheel. The low pressure fluid flowing to line 170B moves to control a valve 860 of a similar system on an opposite wheel. This relates to a balancing action to be described later. As the fluid returns from the system on the opposite wheel, it comes into line 264A of the flow meter 264 of FIG. 1a and thence to line 264B leading to the T port of rectifier valve 100. It passes to the A or B port of this rectifier valve 100 (whichever is not pressurized) and then back to the main housing of the pump 10.

As the vehicle stops and the rotor 11 stops, the flow detector valve 104 detects no fluid flow and valve 102 shifts under action of spring 182 and the fluid in hydraulic cylinder 36 starts to move to tank or the T port (low pressure side) of the servo valve through line 180. This relieves hydraulic pressure in cylinder 36 and on piston 38, and, since there is no air pressure in cylinder 39, the spring 40 acting on piston 39 will bring the static brake, i.e., the dead stop cone 13 in contact with shoe 12.

To release the dynamic brake, the operator releases the brake pedal 56 which causes air pressure to build up in air cylinder 88 which balances the air cylinders 88 and 92 to shift the relay cylinder 83 and air valve 82 to neutral. The port plate and stator ring 19 must now be moved back to neutral. This is accomplished because the cam on housing 19 has shifted the plunger 74 to actuate valve 72 to such a position that pressure on line 135 (which is pressurized when the brakes are off) will pass through valve 60 in its unactuated position (normally open) to line 162 at valve 72 and then to line 160 leading to air motor 28. This will actuate the air motor in a reverse direction to bring the stator ring and port plate to neutral. In a reverse action, line 152 would receive pressure through valve 72 from line 135 to actuate the air motor to restore the stator ring and port plate to neutral. When the port plate and stator ring 19 reach neutral position, the cam 78 holds the air valve 72 in the neutral blocking position.

It will be appreciated that any power brake system will be improved if there is an anti-lock-up system, that is, a system which prevents the skidding of any one wheel. To prevent this, there must be a means responsive to wheel speed to prevent the locking of the wheel prior to proper slow down. It is also desirable to have a system wherein opposed wheels on an axle receive a balanced braking action to prevent side sway. The present system is designed to have these features.

With respect to anti-skid or anti-lock-up, reference is made to FIGS. 1 and 1a and FIG. 12. It will be noted that valve 250 detailed in FIG. 11 controls air lines 134 and 137. This air valve has a spool 250A which is controlled at the left end by a spring 254A actuated by a plunger 254B which is in turn actuated by a mechanical link 254 which connects to actuator 156 operated by element 106 illustrated in FIG. 7. A spring backed detent 250C insures a positive action of valve 250A. At the right hand end of the valve is a hydraulic piston 250D in the hydraulic control block 252 connected to line 172 which connects back to the time delay valve 171 at the flow detector system where it will connect to the line 170 in operation. Thus, the pressure in the system when the brake is being actuated will reflect in line 172. In the position of the valve 250A as shown in FIG. 11, both lines 137 and 134 go straight through the valve independently. Under normal braking conditions, the mechanical pressure on spring 254A will balance the hydraulic pressure from line 172 on piston 250D. If one wheel starts to lock up, pressure on the flow detector will diminish thus easing off the parts to neutral which reacts on link 156 to diminish the force on spring 254A. This will allow the hydraulic piston P to shift valve spool 250 which will connect both lines 134 and 137 below valve 250 to the line 137 above the valve. The effect is to balance out the relay cylinder 83 so that it tends to shift to a neutral position. This shifts the servo valve toward neutral which eases off the braking force to prevent skidding. The wheel then accelerates to increase flow in the detector 104 which reflects on link 156 to balance out the forces on valve 250A resulting in the return of the valve to the original position shown in FIG. 11. Thus, any tendency for one wheel to slow abnormally prior to stopping will cause an instantaneous response which temporarily eases off the brake flow to prevent lock-up.

It will be noted that in FIG. 7 illustrating the flow detector, there is a small by-pass port 104A. This determines the speed at which the wheel will lock up as the vehicle comes to a stop. At lower speeds, the port 104A permits enough fluid flow independently of the flow detector so that link 156 is not actuated.

The brake balance system is illustrated in FIGS. 1, 1a, FIG. 12 and FIG. 13. Valve 260 has a spool 260D positioned by a detent 260E. In the position shown in FIG. 12, the lines 134 and 137 pass through the valve independently. A spring 260F holds the valve 260D in a starting position. When valve 260D is shifted to the right, line 137 above the valve is connected to both lines 134 and 137 below the valve as viewed in FIG. 1a, thus neutralizing the relay valve system 83.

At each end of the valve spool 260D is a piston 260G and 260H facing a chamber in which spring backed ball valve 264E and 262E are located, each serving as a flow meter.

In FIG. 13, the balance valve 260 of FIG. 1a is shown on the left side of line S—S. On the right side of line S—S is a valve 860 which will be identical except that it is located in an identical brake system for a second wheel assembly on the same axle. The systems are interconnected by the balance valves 260 and 260A but there is no fluid transfer between the two systems. The balance system only operates when the air system is functioning normally.

In the operation of the brake balance system, as fluid comes out of the low pressure side of the relief valve 112 in FIG. 1a and FIG. 13, it travels to flow meter 864 on the right-hand brake system and returns through line 264A to flow meter 264 on the left side. Similarly, the outflow of relief valve 812 on the right side passes fluid through line 870 to flow meter 262 on the left side and returns to the opposite brake system through line 864A. Flow through meter valve 264E will return to the rectifier valve 100 through line 264B. The spring 260F and detent 260E will provide a threshhold resistance which requires a predetermined differential before the balancing will function.

The brake balancing operation operates as follows. The fluid leaves relief valve 112 and enters the flow meter pilot 864 of the right-hand brake and returns from that flow meter on line 264A and enters flow meter 264 on the left side, then returns to the rectifier valve 100 through line 264B. When the flow is balanced on both brake systems, the valve 260D will remain in the position shown in FIG. 13. If the left-hand brake wheel is slower than that of the right-hand brake wheel, then the valve 260D is shifted to the right by increased flow through flow meter valve 264E (FIG. 12). This shifting of valve spool 260D directs air pressure from line 137 above the valve to lines 134 and 137 below the valve, thus tending to shift the relay system toward neutral. This will effect an easing of the braking on the left-hand wheel to effect a balancing action. It will be seen that if the right-hand wheel is slower than the left, the same effect will occur in the right-hand system containing relief valve 812 and rectifier valve 800.

As soon as the wheels are operating so that the flows are equal, the spring 260F will bring the valve spool 260D back to the normal position.

THE ELECTRICAL SYSTEM

Reference has been made in the above description of the various parts to solenoids and switches. The electrical system originates at a battery 114 (FIG. 1a) which is in a circuit with a red signal light 110 in line 110a. If spring operated switch 108 is closed by loss of air pressure in the system, the light 110 will be turned on. From the negative pole of the battery, a line 114a leads down to branch lines 84a and 94a connected respectively to solenoids 84 and 94. A line 29a leads off from line 114a to motor 29.

The positive side of the battery connects through switch 108 to a line 114b (FIG. 1a) which leads to a double pole, double throw switch 500. This line 114b also connects to a potentiometer 62 operated by link 59 and to a two-position switch 66 (FIG. 1a). The potentiometer is connected through a line 62a to a rotary switch 35 which in turn is connected by lines 35a and 35b to motor 29. Switch 66 is connected by line 66a to a three-position detent switch 70. The other poles of switch 70 are connected by lines 70a and 70b to lines 35a and 35b leading to electric motor 29.

Solenoid 42 at the top of FIG. 1a is connected at one pole to the battery by line 42a. The other pole of solenoid 42 is connected by line 42b to the potentiometer 62 and also to the center poles of switch 500. The outer and lower contacts of switch 500 are connected by lines 84b and 94b to solenoids 84 and 94.

In the operation of this electrical system, in the event of air pressure failure, the switch 108 will close to activate the electrical system. It will be remembered that shaft 33 operates the air disc switch for directional indication and it also operates the directional switch 35 (FIGS. 1a and 2).

Thus, the solenoids 84 and 94 will perform the functions of air cylinders 88 and 92 while motor 29 performs the function of the air motor 28. Switch 70 performs the comparative function of valve 72 relative to the actuation of motor 29 in the restoration of neutral position of the stator and port plate. Solenoid 42 in FIG. 2 (also FIG. 1a) will replace the air cylinder 39 for the function of holding the cone brake in off position while the system is operating. The potentiometer 62 performs the same function as the operating valve 68 when the electrical system is in control. For example, brake pedal pressure will lower the potential on one of the otherwise equalized solenoides 84 and 94 to cause the relay system 83 to shift to actuate the brake system.

The basic braking system, as above described, utilizes a variable displacement pump directing hydraulic fluid to a pressure relief valve 112 having a fixed pressure setting. This can be a piston type, spring backed valve with a by-pass port which is uncovered by the pressure acting on the piston, FIG. 5. At low speeds, the pump, in order to reach the relief valve setting, has a greater displacement. In the stop position, the displacement would be the greatest. At high speeds, the displacement is less but the speed of the pump greater so there is always a constant pressure in the system. The pressure contemplated is in the range of 2000 pounds per square inch for heavy vehicles but less for smaller vehicles. A suitable non-foaming hydraulic fluid such as a silicone base brake fluid can be used. Likewise, a heat sink and cooling device can be utilized to maintain a proper temperature in the system.

Figure 15:
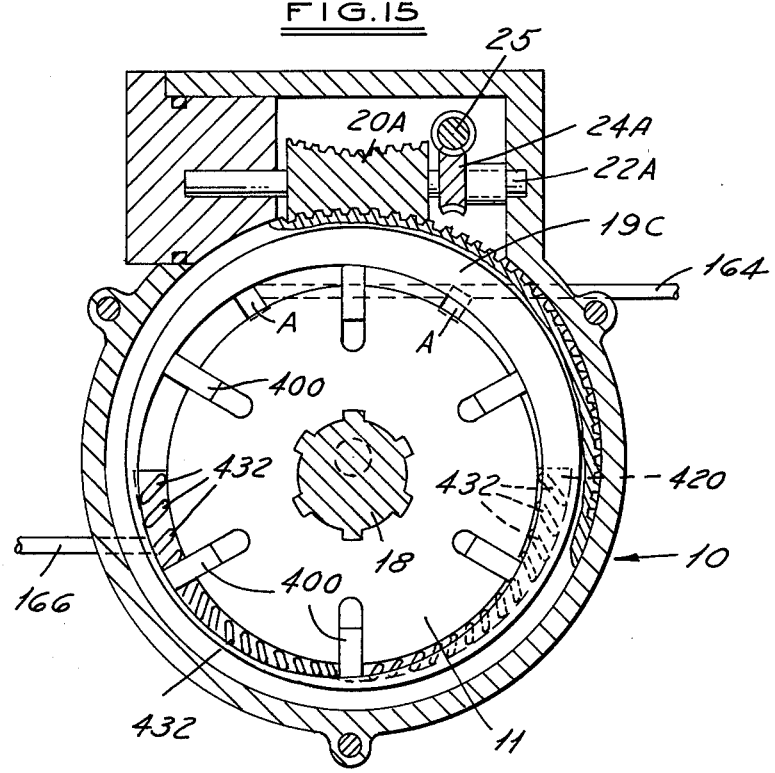

In FIGS. 14 to 17 is illustrated a modified wheel actuated rotary pump design. Except where there is a departure from the design of FIGS. 2 and 3, similar reference characters have been used. A main brake housing 10 in FIGS. 14 to 17 is located at the vehicle wheel W and has a vane pump rotor 11 driven by the wheel which has a conical brake drum 12 and a conical brake shoe 13. The wheel axle is mounted in bearings 15 and 16 and the pump rotor is mounted on a splined portion 18 of the axle 14. On one side of the rotor 11 is a stationary port plate 17A (FIG. 17) also located against a pump housing ring or stator 19C which surrounds the rotor 11. The main housing 10, as in FIGS. 2 and 3, has the outlet and inlet ports A and B leading to the passages 164 and 166 respectively. THe port plate 17A has two ports A at the top area and a plurality of slots 432 arranged arcuately to overlie an arcuate port 420 in the main housing 10 leading to passage 166. The stator ring has a circular outer surface which rotates in a circular recess in housing 10. The inner recess of the stator ring in which the rotor 11 is located is eccentric to the outer surface of the ring as shown in FIGS. 15, 16 and 17.

The stator ring has teeth on the upper periphery to engage with a helical drive screw 20A on shaft 22A which carries a worm gear 24A driven by the worm shaft 25 leading to the motors 26, 27 and 28 (FIG. 4). The magnetic disc operators are mounted at the inner end of shaft 18 as in FIG. 2. The outer end of the rotor 11 and stator ring 19C is closed by a stationary plate 404 held in place by the end plate 10A of housing 10. The cable 41a in this embodiment is connected at 41c to the stator ring 19C and is actuated by cable 41 connected to link lever 52 (FIG. 1).

In the operation of the pump-motor embodiment of FIGS. 14 to 17, rotation of the axle 14 will rotate the rotor 11 in the stator ring 19C. In the position shown in FIG. 14, no pressure will develop and no flow will take place. If the brake is actuated by the operator as previously described, the pilot air motor will actuate shaft 25 and the helical screw 20A to shift the stator ring off-center as illustrated in FIG. 15. Fluid now enters passage 166 into port B and underlying arcuate passage 420 leading to slots 432. This fluid is compressed by the vane rotation in the eccentric passages until it exits at ports A to passage 164 leading to the rectifier valve 100. Beyond this point, the operation is as previously described. The structure disclosed in FIGS. 14 to 17 is simpler and easier to manufacture and maintain than the device of FIGS. 2 and 3.

The pumps disclosed may be utilized in other devices as pumps, motors, transmissions, fluid couplings, delayed action couplings and the like. The design is such that it is self-cooling and thus adaptable to repeated starts and stops without undue heating.

We claim:

1. A variable displacement rotary transmission device for use as a pump and motor in a hydraulic power system which comprises:
   (a) a pump housing having a circular recess,
   (b) a stator ring having a circular periphery movable in rotation in said recess having a circular rotor recess off-center from the periphery,
   (c) a rotor having radial vanes in the circular recess of said stator ring,
   (d) a port plate on one side of said stator ring and rotor having inlet and outlet ports in the area of rotation of said vanes of said rotor, and
   (e) means to effect relative rotation of said stator ring and said port plate to alter the spacing between the periphery of said rotor and the inner wall of said recess in said stator ring to create areas of compression and expansion for fluid around said rotor.

2. A device as claimed in claim 1 in which said means to create a relative rotation between said stator ring and said port plate comprises a worm gear device, and teeth formed on at least one of said stator ring and said port plate to cause rotative motion in response to motion of said worm gear.

3. A variable displacement rotary transmission device for use as a pump and motor in a hydraulic power system which comprises:
   (a) a pump housing having a rotor cavity,
   (b) a port plate on one side of said cavity movable to varying positions circumferentially,
   (c) a stator ring lining said cavity radially having a rotor opening eccentrically disposed relative to the cavity,
   (d) a rotor having radial vanes within the stator ring, and
   (e) means to shift said stator ring and port plate circumferentially to effect flow of fluid through said pump.

4. A variable displacement rotary transmission device for use as a pump and motor in a hydraulic power system which comprises:
   (a) a pump having a circular recess,
   (b) a stator ring having a circular periphery movable in rotation in said recess having a circular rotor recess off-center from the periphery,
   (c) a rotor having radial vanes in the circular recess of said stator ring,
   (d) a port plate on one side of said stator ring and rotor having inlet and outlet ports in the area of rotation of said vanes of said rotor, and
   (e) means to effect rotation of said stator ring to move said recess of said stator ring off center of said rotor to create areas of compression and expansion for fluid around said rotor.

5. A device as claimed in claim 4 in which said means to create relative rotation between said stator ring and said port plate comprises a worm gear, and teeth on a portion of the periphery of said stator ring to cause rotative motion of said stator ring in response to motion of said worm gear.

6. A dynamic brake system for a vehicle in which a wheel to be braked is connected to a rotating member which comprises:
   (a) a wheel driven variable displacement pump driven by said member having an inlet and outlet,
   (b) a pre-set flow restriction means,
   (c) circuit means to connect an outlet of said pump to said flow restriction means to effect a motion retarding force on said pump and a wheel connected therewith, and
   (d) said variable displacement pump having a portion movable to control the displacement of the pump, a pressure operable motor to actuate said movable portion, a servo-valve to direct operating flow to said motor, and means to control said servo-valve in response to an operator signal.

7. A dynamic brake system for a vehicle in which a wheel to be braked is connected to a rotating member which comprises:
   (a) a wheel driven variable displacement pump driven by said member having an inlet and outlet,
   (b) a pre-set flow restriction means,
   (c) circuit means to connect an outlet of said pump to said flow restriction means to effect a motion retarding force on said pump and a wheel connected therewith, and
   (d) a movable portion on said pump to control the displacement, an air motor connected to move said portion, a source of air pressure, and means to connect said source to said air motor to initiate displacement of said pump and said motion retarding force.

8. A dynamic brake system as defined in claim 7 in which a hydraulic motor is operable to move said portion, a hydraulic servo-valve to direct pressure to said hydraulic motor, and means to control said servo-valve in response to an operator signal.

9. A dynamic brake system as defined in claim 8 in which said servo-valve has an input portion responsive to operator signal and an output portion responsive to movement of said pump displacement portion.

10. A dynamic brake system as defined in claim 9 in which a directional control means is connected into said circuit means to respond to the direction of wheel rotation to direct a wheel retarding force on said pump regardless of the direction of rotation.

11. A dynamic brake system as defined in claim 7 in which a relay system is provided to initiate dynamic braking comprising a piston-cylinder combination and air valve actuatable in response thereto, said relay system being normally air balanced, operator valve means movable to create an unbalance in said relay system to cause shifting of said air valve and connection of said air pressure source to said air motor to initiate displacement of said pump.

12. A dynamic brake system as defined in claim 11 in which a hydraulic servo-valve is provided in the circuit means, a hydraulic motor connected to shift said movable portion of said pump, and means connecting said servo-valve and said hydraulic motor to control the displacement of said pump when said vehicle wheel is rotating.

13. A dynamic brake system as defined in claim 11 in which an electrical solenoid system is provided in said relay system to actuate said piston-cylinder combination in the event of air pressure loss, and a manual override lever to actuate said piston-cylinder combination in the event of electrical failure.

14. A dynamic brake system as defined in claim 13 in which a pressure actuated normally open switch is resiliently biased to closed position to initiate an elecrical back-up system in the event of air pressure loss.

15. A dynamic brake system as defined in claim 13 in which an electrical directional control switch is actuated to one of two positions, depending on the direction of the wheel rotation, said switch being interposed between a source of electrical voltage and said solenoid system.

16. A dynamic brake system as defined in claim 7 which includes a directional air valve, lines connecting said air valve to said air motor, and means responsive to the motion of said movable portion to shift said air valve in a direction responsive to the direction of motion of said movable portion to connect said air motor to a source of air pressure to return said movable portion to a neutral position when said vehicle wheel is stopped.

17. A dynamic brake system for a vehicle in which a wheel to be braked is connected to a rotating member which comprises:
(a) a wheel driven variable displacement pump driven by said member having an inlet and outlet,
(b) a pre-set flow restriction means,
(c) circuit means to connect an outlet of said pump to said flow restriction means to effect a motion retarding force on said pump and a wheel connected therewith,
(d) a flow detector means connected in said circuit,
(e) a resilient means to actuate a dead stop brake system to operate when said vehicle is at rest, and
(f) a fluid pressure system to counteract said resilient means, said fluid pressure system being responsive to said flow detector means to hold said dead stop brake in off position during vehicle operation.

18. A dynamic brake system for a vehicle in which a wheel to be braked is connected to a rotating member which comprises:
(a) a wheel driven variable displacement pump driven by said member having an inlet and outlet,
(b) a pre-set flow restriction means,
(c) circuit means to connect an outlet of said pump to said flow restriction means to effect a motion retarding force on said pump and a wheel connected therewith, and
(d) a resiliently biased, static friction brake for the wheel being controlled, pressure means to release said friction brake, means to direct hydraulic pressure output to said pressure means, and a time delay means controlling said last means to prevent static brake action when the controlled wheel is still rotating.

19. A dynamic brake system for a vehicle in which a wheel to be braked is connected to a rotating member which comprises:
(a) a wheel driven variable displacement pump driven by said member having an inlet and outlet,
(b) a pre-set flow restriction means,
(c) circuit means to connect an outlet of said pump to said flow restriction means to effect a motion retarding force on said pump and a wheel connected therewith, and
(d) an electrical directional control switch actuatable to one of two positions depending on the direction of the wheel rotation, said switch being interposed between a source of electrical voltage and a solenoid relay system to initiate brake action in response to an operator controlled potentiometer.

20. A dynamic brake system for a vehicle in which a wheel to be braked is connected to a rotating member which comprises:
(a) a wheel driven variable displacement pump driven by said rotating member having an inlet and an outlet and operable at zero displacement when said brake system is non-functional,
(b) a flow restriction means in an outlet of said pump,
(c) circuit means to connect an outlet of said pump to said flow restriction means to effect a motion retarding force on said pump and a wheel connected therewith,
(d) valve means in said circuit means responsive to a brake signal from an operator to initiate a brake displacement and pumping action in said variable displacement pump to create said motion retarding force,
(e) said circuit means for controlling the stopping of one wheel having a flow detector means which responds in one position to hydraulic flow created by wheel rotation and in a second position to lack of such flow, and
(f) anti-lock up valve means in said circuit responsive to said flow detector positions to interrupt braking action when said wheel is slowed or locked prior to stopping of the vehicle to provide an anti-skid function.

21. A dynamic brake system for a vehicle in which a wheel to be braked is connected to a rotating member which comprises:
(a) a wheel driven variable displacement pump driven by said member having an inlet and outlet,
(b) a pre-set flow restriction means,
(c) circuit means to connect an outlet of said pump to said flow restriction means to effect a motion retarding force on said pump and a wheel connected therewith,
(d) said circuit means for controlling the stopping of one wheel having a flow detector means which responds in one position to hydraulic flow created by wheel rotation and in a second position to lack of such flow,
(e) anti-lock up valve means in said circuit responsive to said flow detector positions to interrupt braking action when said wheel is slowed or locked prior to stopping of the vehicle to provide an anti-skid function, and
(f) said anti-lock up valve means being responsive mechanically to movement of said flow detector means and responsive hydraulically to flow through said flow detector means.

22. A dynamic brake system for a vehicle in which a wheel to be braked is connected to a rotating member which comprises:
   (a) a wheel driven variable displacement pump driven by said member having an inlet and outlet,
   (b) a pre-set flow restriction means,
   (c) circuit means to connect an outlet of said pump to said flow restriction means to effect a motion retarding force on said pump and a wheel connected therewith,
   (d) said circuit means for controlling the stopping of one wheel having a flow detector means which responds in one position to hydraulic flow created by wheel rotation and in a second position to lack of such flow,
   (e) anti-lock up valve means in said circuit responsive to said flow detector positions to interrupt braking action when said wheel is slowed or locked prior to stopping of the vehicle to provide an anti-skid function,
   (f) a static friction brake resiliently biased to braking position held in released position by pressure from said pump passing through said flow detector means, and
   (g) a time delay device interposed between said static brake and said detector means to delay application of said static brake upon momentary stopping of the wheel being controlled.

23. A dynamic brake system for a vehicle in which a wheel to be braked is connected to a rotating member which comprises:
   (a) a wheel driven variable displacement pump driven by said member having an inlet and outlet,
   (b) a pre-set flow restriction means,
   (c) circuit means to connect an outlet of said pump to said flow restriction means to effect a motion retarding force on said pump and a wheel connected therewith, said circuit means having a brake application valve which functions in one position to interrupt braking action, and
   (d) flow responsive means at each end of said valve to receive and reflect the flow of pressure fluid from a second vehicle braking system on another wheel of the same vehicle to create a balanced braking action on opposite sides of the vehicle.

24. A dynamic brake system for a vehicle in which a wheel to be braked is connected to a rotating member which comprises:
   (a) a wheel driven variable displacement pump driven by said member having an inlet and outlet,
   (b) a pre-set flow restriction means,
   (c) circuit means to connect an outlet of said pump to said flow restriction means to effect a motion retarding force on said pump and a wheel connected therewith, said circuit means having a brake application valve which functions in one position to interrupt braking action,
   (d) flow responsive means at each end of said valve comprising spring backed check valves in pressure chambers at the end of said valve, and
   (e) a spring urging said application valve to an open position wherein loss of flow in one circuit due to wheel stoppage will interrupt flow in the other circuit to bring about brake balancing on opposite sides of a vehicle.

25. A dynamic brake system for a vehicle in which a wheel to be braked is connected to a rotating member which comprises:
   (a) a wheel driven variable displacement pump driven by said member having an inlet and outlet,
   (b) a pre-set flow restriction means,
   (c) circuit means to connect an outlet of said pump to said flow restriction means to effect a motion retarding force on said pump and a wheel connected therewith, and
   (d) said variable displacement pump comprising:
      (1) a pump housing having a rotor cavity,
      (2) a port plate on one side of said cavity movable to varying positions circumferentially,
      (3) a stator ring lining said cavity radially having a rotor opening eccentrically disposed relative to the cavity,
      (4) a rotor having radial vanes within the stator ring, and
      (5) means to shift said stator ring and port plate circumferentially to effect flow of fluid through said pump.

26. A device as defined in claim 25 in which said means to shift said stator ring and port plate circumferentially comprises a worm gear device, and teeth formed on said stator ring and said port plate in mesh with said worm gear device, and means to rotate said worm gear device in response to operator braking motion.

27. A dynamic brake system for a vehicle in which a wheel to be braked is connected to a rotating member which comprises:
   (a) a wheel driven variable displacement pump driven by said member having an inlet and outlet,
   (b) a pre-set flow restriction means,
   (c) circuit means to connect an outlet of said pump to said flow restriction means to effect a motion retarding force on said pump and a wheel connected therewith, and
   (d) said variable displacement pump comprising:
      (1) a pump housing having a circular recess,
      (2) a stator ring having a circular periphery movable in rotation in said recess having a circular rotor recess off-center from the periphery,
      (3) a rotor having radial vanes in the circular recess of said stator ring,
      (4) a port plate on one side of said stator ring and rotor having inlet and outlet ports in the area of rotation of said vanes of said rotor, and
      (5) means to effect relative rotation of said stator ring and said port plate to alter the spacing between the periphery of said rotor and the inner wall of said recess in said stator ring to create areas of compression and expansion for fluid around said rotor.

28. A device as defined in claim 27, in which said means to shift said stator ring and port plate circumferentially comprises a worm gear device, and teeth formed on said stator ring and said port plate to mesh with said worm gear device, and means to rotate said worm gear device in response to operator braking motion.

29. A dynamic brake system for a vehicle in which a wheel to be braked is connected to a rotating member which comprises:
   (a) a wheel driven reversible variable displacement pump with a rotating member driven by said rotating member having passages to serve alternately as an inlet and an outlet depending on the direction of operation and operable at zero displacement when said rotating member is operating and said brake system is non-functional,
(b) a flow restriction means to be connected selectively to a pump passage serving as an outlet of said pump,
(c) circuit means to connect a passage of said pump serving as an outlet to said flow restriction means to effect a hydrodynamic motion retarding force on the rotating member of said pump and a wheel connected therewith, and
(d) valve means in said circuit means responsive to a brake signal from an operator to initiate a directional displacement from zero displacement to effect a pump discharge from said variable displacement pump to create said hydrodynamic motion retarding force on the output of said pump.

* * * * *